June 7, 1960  H. M. FOX  2,939,278
MEANS AND METHOD FOR STARTING ROCKET MOTORS
Filed Feb. 28, 1955
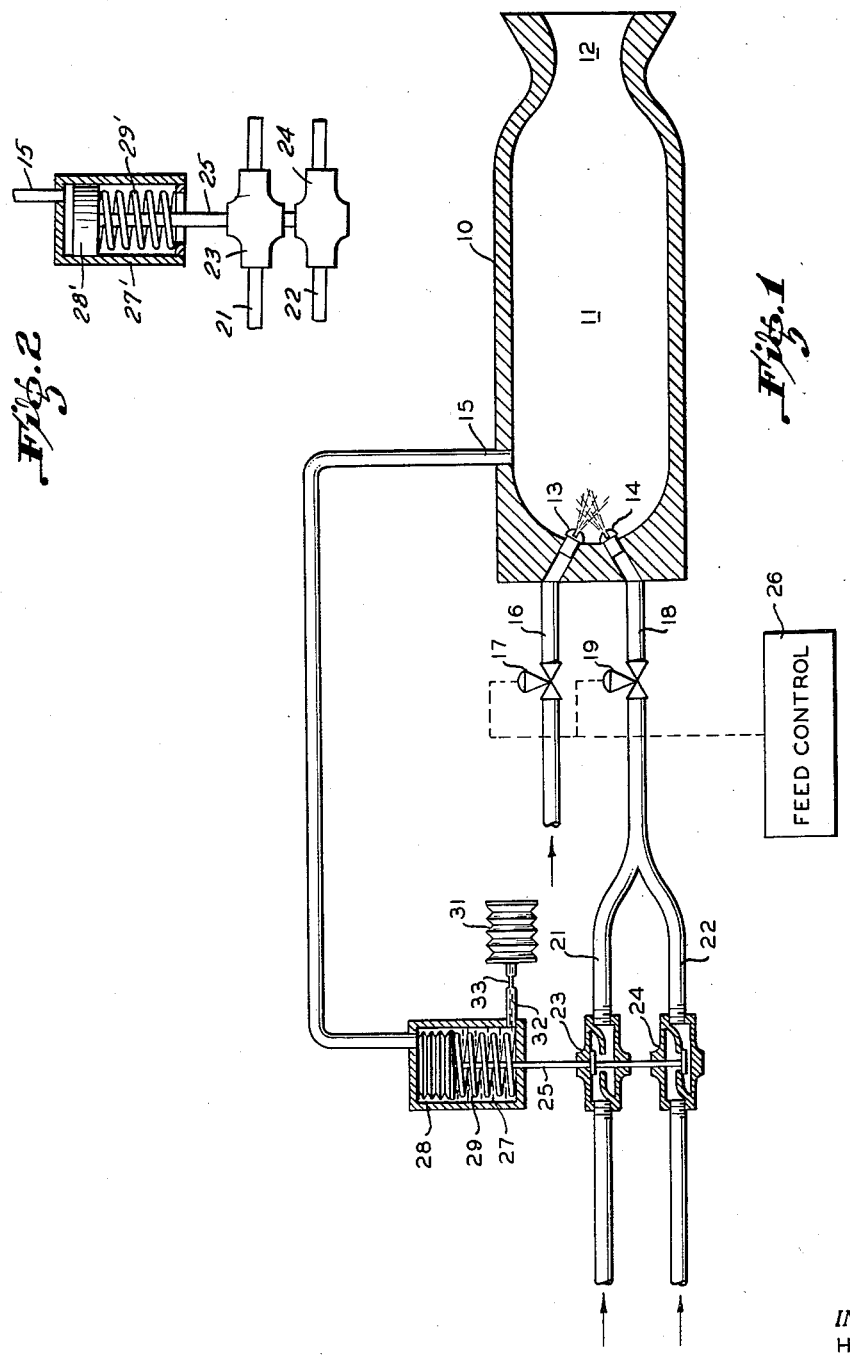
INVENTOR.
H. M. FOX
BY Hudson and Young
ATTORNEYS

United States Patent Office 2,939,278
Patented June 7, 1960

2,939,278

MEANS AND METHOD FOR STARTING ROCKET MOTORS

Homer M. Fox, Bartlesville, Okla., assignor to Phillips Petroleum Company, a corporation of Delaware Filed Feb. 28, 1955, Ser. No. 490,759

6 Claims. (Cl. 60—35.6)

This invention relates to the operation of rocket motors. In a more specific aspect this invention relates to the starting of liquid non-hypergolic fuel rocket motors by hypergolic fuel ignition. In another of its more specific aspects this invention relates to a method and means for starting a rocket motor with a hypergolic fuel and continuing the operation of the motor with a non-hypergolic fuel.

Liquid fuels and liquid oxidizers offer advantages in the operation of a rocket motor and are particularly adapted for rocket motors which are intended to operate over an extended period of time because lower operating temperatures and more positive control of operating conditions are possible with liquid rocket fuels than are possible with solid propellants.

The starting procedure of a rocket motor utilizing liquid fuel and oxidant has to be accurately controlled so that smooth and even combustion initiation is achieved. Non-hypergolic fuels may be ignited, in the presence of the oxidant, by spark plug ignition, powder charge ignition, catalytic ignition, or hypergolic fuel ignition. Hypergolic fuel ignition is frequently employed and is usually preferred to the other systems of ignition because of its simplicity of operation, the high temperatures obtained, and the reliability of the method in obtaining instantaneous and positive ignition. Hypergolic fuel ignition is a method whereby a fuel, which ignites spontaneously with the oxidant, is injected into the combustion chamber in contact with the oxidant for a very short period during the starting operation. After the initial ignition is obtained, the combustion can be continued with a non-hypergolic fuel and oxidant combination. The combustion of nitric acid and a hydrocarbon fuel such as jet fuel can, for instance, be initiated by the introduction of a small quantity of aniline and oxidant at the beginning of the motor operation.

A disadvantage, however, which has existed in using the hypergolic fuel ignition is that of cutting off the supply of hypergolic fuel with the arrival of the first amounts of non-hypergolic fuel, a pressure oscillation often develops which tends to persist throughout the combustion of the non-hypergolic fuel. I have found that one method of overcoming this difficulty is to gradually dilute the hypergolic fuel with the non-hypergolic fuel during the transition period and in this manner smooth combustion is achieved. The hypergolic fuel must be compatible with the non-hypergolic fuel component.

It is an object of this invention to provide a method for transition of a hypergolic fuel to a non-hypergolic fuel in a rocket motor without the introduction of pressure oscillations into the combustion process.

It is an object of this invention to provide an apparatus for changing from a hypergolic to a non-hypergolic fuel in a rocket motor without the introduction of pressure oscillations in the combustion process.

Another object of this invention is to provide a method for initiating and continuing smooth combustion in a rocket motor.

It is still another object of this invention to provide a fuel injection system in a rocket motor whereby the hypergolic fuel is gradually diluted with non-hypergolic fuel during the transition from hypergolic fuel injection to non-hypergolic fuel injection.

It is still another object to provide a system for rocket motor operation which will automatically restart a rocket motor if for some reason the flame is extinguished.

Other and further objects and advantages will be apparent to one skilled in the art upon study of this disclosure including the appended drawing wherein a preferred embodiment of the invention is schematically illustrated.

Figure 1 illustrates the complete preferred embodiment of the invention.

Figure 2 illustrates a modification of the valve actuating device.

Broadly, the invention provides a method for hypergolic fuel ignition of non-hypergolic fuels by the gradual dilution of hypergolic fuel with non-hypergolic fuel after ignition is achieved so that the transition period is gradual and smooth.

The simple valving system of this invention automatically accomplishes smooth transition from hypergolic fuel to non-hypergolic fuel. This smooth transition has not always resulted in the systems of the prior art. The system for burning fuel in a rocket motor, according to this invention, comprises bringing together in a combustion chamber an oxidizer and a hypergolic fuel so as to initiate combustion, then gradually diluting the hypergolic fuel with non-hypergolic fuel so as to insure smooth transition from the hypergolic fuel to the non-hypergolic fuel and finally supplying to the combustion chamber an oxidizer and a non-hypergolic fuel so as to continue the combustion. Upon starting the rocket motor, a selector-proportioning valve first admits the hypergolic fuel to the combustion chamber together with the oxidizer. As soon as the pressure in the combustion chamber reaches a predetermined value, the selector-proportioning valve begins to open the main non-hypergolic fuel line and at the same time begins to close the hypergolic fuel line. A delay system can be incorporated if desired, so as to accomplish the transition over a predetermined length of time.

If combustion is interrupted, with fuel and oxidant flowing, hypergolic fuel will be injected as a result of decreased pressure in the combustion chamber and ignition will be initiated in the combustion chamber. If the rocket motor is intentionally stopped by stopping the flow of fuel and oxidant, the proportioning valve is automatically reset for instant starting.

The oxidizers preferred in the practice of the invention are white fuming nitric acid containing a maximum of about 2 percent by weight of water and red fuming nitric acid containing about 2.5 weight percent of water and about 16 weight percent $NO_2$. Other nitric acids, liquid nitrogen dioxide, liquid hydrogen peroxide, liquid oxygen and other strong oxidizing agents also can be used as oxidizers when the starting fuel used is hypergolic with the oxidizer.

There are many hypergolic fuels available, while the following list is not intended ot be exhaustive it will illustrate the wide variety of materials which have the property of spontaneous combustion on being contacted with strong oxidizers such as fuming nitric acids. These materials include unsaturated hydrocarbons of the acetylene and diolefin series, for example, divinyl acetylene, dipropargyl, propargyl alcohol, 2-methyl-1,3-butadiene and dicyclopentadiene; nitrogen-containing petroleum derivatives, for example, diallylamine, 1,3-diaminobutane, 2-amino-5-diethylaminopentane, aniline, phenetidine, and pyrrole; sulfur-containing petroleum derivatives, for example, normal butyl mercaptan, divinyl sulfide and diallyl sulfide; petroleum derivatives containing both sulfur and nitrogen, for example, N-methylethylsulfenamide, 2-aminothiophenol and N-methyl-tertiary-butylsulfenamide; oxygen-containing petroleum derivatives, for example, 2-methoxybutadiene, geraniol, linalool, 2-methylfuran and furfural alcohol; combustible liquid slurries of elements such as potassium and sodium; for example, dispersions of sodium in ether; liquid hydrides of metals, for example, pentaborane ($B_5H_9$); liquid organometallic compounds such as aluminum triethyl; liquid fuels containing sodium or potassium in solution, for example, sodium dissolved in xylene; and liquid fuels containing sodium or potassium in suspension, for example, dispersions of sodium in gasoline.

Non-hypergolic fuels include gasoline, benzene, JP-3, JP-4 or JP-5 jet fuels.

As an example of a preferred embodiment of my invention, reference is made to Figure 1 of the drawing wherein 10 represents a rocket motor comprising a combustion chamber 11 and a rearwardly directed exhaust nozzle 12. Oxidant nozzle 13, fuel nozzle 14 and pressure line 15 are in communication with combustion chamber 11. Oxidant supply line 16, controlled by valve 17, is in communication with nozzle 13. Fuel supply line 18 and valve 19 are in communication with fuel inlet nozzle 14. Hypergolic fuel line 21 and non-hypergolic fuel line 22 are in communication with line 18 and valve 19. Valve 23 is positioned in fuel line 21. Valve 24 is positioned in fuel line 22. Valves 23 and 24 are connected to a common shaft 25 and adapted so that when one valve is closed the other valve is open. Valves 17 and 19 are operated simultaneously by feed control means 26. Cylinder 27 contains bellows 28 which is in communication with combustion chamber 11 by line 15. Bellows 28 is connected to valves 23 and 24 by means of shaft 25 and is maintained in the position shown by spring 29. Bellows 31 is connected to cylinder 27 by conduit 32 containing orifice 33. Bellows 31 and cylinder 27 are liquid filled. Orifice 33 acts as a damper upon the movement of bellows 28 and is calibrated so as to provide the desired time delay of movement of bellows so as to provide the desired transition from hypergolic fuel to non-hypergolic fuel. A period of time from one to two seconds is usually required for smooth transition from hypergolic fuel to non-hypergolic fuel.

The choice of liquid employed to fill bellows 31 and cylinder 27 will depend upon the expected use of the rocket motor and the location of the bellows and cylinder with respect to the combustion chamber. If low temperatures encountered, for example at high altitudes, are anticipated, then a liquid having a low freezing point and pour point such as normal hexane, ethylene glycol-water mixtures, etc. should be used. If high temperatures, such as might be caused by the combustion chamber, are anticipated then a high boiling point liquid such as a lube oil should be used.

The operation of the system will now be described with reference to the drawing. Combustion in the rocket motor is initiated by operating feed control 26 so as to simultaneously open valves 17 and 19 thus introducing oxidant from a supply, not shown, through valve 17, line 16 and orifice 13 and simultaneously introducing hypergolic fuel from a supply, not shown, through valve 23, line 21, valve 19, line 18 and nozzle 14, whereby combustion is spontaneously initiated in combustion chamber 11. The combustion of hypergolic fuel and oxidant raises the temperature and pressure within combustion chamber 11 thus exerting pressure on bellows 28 in cylinder 27 by means of line 15 so as to move bellows 28 so as to close valve 23 and simultaneously to open valve 24 thus introducing non-hypergolic fuel from a supply, not shown, through valve 24, line 22, valve 19, line 18 and nozzle 14 to combustion chamber 11. The flow of fuel to combustion chamber 11 is maintained substantially constant while the composition of the fuel supplied to combustion chamber 11 is gradually changed from hypergolic fuel to non-hypergolic fuel.

If feed control means 26 is operated so as to close valves 17 and 19, thus extinguishing combustion in chamber 11, pressure is released from cylinder 27 through line 15 and spring 29 causing bellows 28 to return to the position shown thereby closing valve 24 and opening valve 23 so that the rocket motor is ready to be restarted by operating feed control means 26 so as to open valves 17 and 19.

A modification of the means for actuating the selector-proportioning valve system is shown in Figure 2. Cylinder 27' is open to the atmosphere at the end of the cylinder in communication with valves 23 and 24 and 28' is a piston connected to shaft 25. Spring 29' operates against the pressure in the combustion chamber so as to actuate valves 23 and 24.

Reasonable variations and modifications are possible within the scope of the disclosure of the invention, the essence of which is a method and apparatus for smooth and positive transition from the use of hypergolic fuel to the use of non-hypergolic fuel in a rocket motor by diluting the hypergolic fuel with non-hypergolic fuel until all of the fuel used is non-hypergolic fuel.

That which is claimed is:

1. An improved rocket motor comprising a combustion chamber; an exhaust nozzle, an oxidant inlet nozzle, and a fuel inlet nozzle in communication with said combustion chamber; means for supplying oxidant to said oxidant nozzle; means for supplying hypergolic fuel to said fuel nozzle; means for supplying non-hypergolic fuel to said fuel nozzle; means for simultaneously actuating said oxidant supply means and said hypergolic fuel means so as to initiate combustion in said combustion chamber; and pressure sensitive means operatively connected to said combustion chamber and to said fuel supply means so as to simultaneously and gradually start said non-hypergolic fuel supply means and to stop said hypergolic fuel supply means when a predetermined pressure is attained in said combustion zone.

2. An improved rocket motor comprising a combustion chamber; an exhaust nozzle; an oxidant inlet nozzle, and a fuel inlet nozzle in communication with said combustion chamber; first supply means for supplying oxidant to said oxidant inlet nozzle; second supply means for supplying fuel to said fuel inlet nozzle; a first conduit means connected to said second supply means and to a source of hypergolic fuel; a second conduit connected to said second supply means and to a source of non-hypergolic fuel; a first valve means in said first conduit; a second valve means in said second conduit; means operatively connected to said first and second valve means so as to open one valve and close the other; a cylinder having one end in communication with said combustion chamber and the other end in communication with the atmosphere; a piston positioned in said cylinder; a spring means adapted to maintain said piston adjacent said cylinder end in communication with said combustion chamber; means operatively connecting said piston to said means connecting said first and second valves; a third conduit means connecting the interior of said combustion chamber with the interior of the end of said cylinder in communication with said combustion chamber; and means for controlling said first and second supply means.

3. In a rocket motor comprising a combustion chamber having an exhaust nozzle, oxidant and fuel inlet nozzles, and means for supplying oxidant, hypergolic fuel and non-hypergolic fuel to said nozzles, the improvement which comprises means for simultaneously actuating said oxidant supply means and said hypergolic fuel supply means so as to supply oxidant and hypergolic fuel to said inlet nozzles and to initiate combustion in said combustion chamber; and pressure sensitive means operatively connected to said combustion chamber and to said fuel supply means so as to simultaneously and gradually start and increase operation of said non-hypergolic fuel supply means and to decrease and stop operation of said hypergolic fuel supply means when a predetermined pressure is attained in said combustion zone.

4. The rocket motor of claim 1 wherein the pressure sensitive means comprises a closed cylinder containing a first bellows, the interior of which is in communication with the combustion chamber and which is operatively connected to said fuel supply means and a spring positioned in said cylinder to force said bellows toward the communication with the combustion chamber; a second bellows having its interior in communication with the interior of the cylinder through an orifice; and a liquid substantially filling the interior of said cylinder and said second bellows.

5. The rocket motor of claim 1 wherein the pressure sensitive means comprises a cylinder having one end in communication with said combustion chamber and the other end in communication with the atmosphere; a piston positioned in said cylinder and operatively connected to said fuel supply means; and a spring positioned in said cylinder to force said piston toward the end of the cylinder in communication with the combustion zone.

6. An improved rocket motor comprising a combustion chamber; an exhaust nozzle; an oxidant inlet nozzle, and a fuel inlet nozzle in communication with said combustion chamber; first supply means for supplying oxidant to said oxidant inlet nozzle; second supply means for supplying fuel to said fuel inlet nozzle; a first conduit means connected to said second supply means and to a source of hypergolic fuel; a second conduit connected to said second supply means and to a source of non-hypergolic fuel; a first valve means in said first conduit; a second valve means in said second conduit; means operatively connected to said first and second valve means so as to open one valve and close the other; a closed cylinder, a first bellows positioned within said cylinder; a third conduit connecting the interior of said first bellows and the interior of the combustion chamber; a spring positioned in said cylinder so as to resist expansion of said first bellows; a linkage operatively connecting said first bellows with said first and second valves; a second bellows; a fourth conduit connecting the interior of said second bellows to the interior of said cylinder; an orifice in said fourth conduit; a liquid substantially filling said cylinder and said second bellows, and means for controlling said first and second supply means.

References Cited in the file of this patent
UNITED STATES PATENTS

| | | |
|---|---|---|
| 2,563,532 | Kistiakowsky | Aug. 7, 1951 |
| 2,637,161 | Tschinkel | May 5, 1953 |
| 2,689,454 | Schneider | Sept. 21, 1954 |